US009015835B2

(12) United States Patent
Gerzon et al.

(10) Patent No.: US 9,015,835 B2
(45) Date of Patent: Apr. 21, 2015

(54) SYSTEMS AND METHODS FOR PROCEDURE RETURN ADDRESS VERIFICATION

(71) Applicants: Gideon Gerzon, Zichron Yaakov (IL); Jared W. Stark, Portland, OR (US); Gal Diskin, Haifa (IL)

(72) Inventors: Gideon Gerzon, Zichron Yaakov (IL); Jared W. Stark, Portland, OR (US); Gal Diskin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/924,591

(22) Filed: Jun. 23, 2013

(65) Prior Publication Data

US 2014/0380468 A1 Dec. 25, 2014

(51) Int. Cl.
*G06F 11/00* (2006.01)
*G06F 21/55* (2013.01)

(52) U.S. Cl.
CPC ...................................... *G06F 21/55* (2013.01)

(58) Field of Classification Search
USPC ........... 726/26–30; 713/187; 712/1, 226, 242; 710/1, 9, 28, 52; 711/128
See application file for complete search history.

(56) References Cited

U.S. PATENT DOCUMENTS

| 5,604,877 | A | * | 2/1997 | Hoyt et al. | ..................... 712/243 |
| 5,850,543 | A | * | 12/1998 | Shiell et al. | ................... 712/238 |
| 5,964,868 | A | * | 10/1999 | Gochman et al. | ............. 712/234 |
| 7,287,283 | B1 | * | 10/2007 | Szor | .............................. 726/26 |
| 7,487,338 | B2 | * | 2/2009 | Matsuo | ......................... 712/226 |
| 2003/0217277 | A1 | | 11/2003 | Narayanan | |
| 2004/0049666 | A1 | | 3/2004 | Annavaram et al. | |
| 2004/0103252 | A1 | | 5/2004 | Lee et al. | |
| 2004/0168078 | A1 | | 8/2004 | Brodley et al. | |
| 2008/0148399 | A1 | | 6/2008 | Winkler | |
| 2008/0301420 | A1 | * | 12/2008 | Inoue | ............................ 712/240 |

OTHER PUBLICATIONS

International Search Report and Written Opinion received for PCT Patent Application No. PCT/US2014/040223, mailed on Sep. 22, 2014, 15 Pages.

* cited by examiner

*Primary Examiner* — Hosuk Song
(74) *Attorney, Agent, or Firm* — Lowenstein Sandler LLP

(57) ABSTRACT

An example processing system may comprise: a stack pointer configured to reference a first return address stored on a stack; a return address buffer pointer configured to reference a second return address stored in a return address buffer; and a return address verification logic configured, responsive to receiving a return instruction, to compare the first return address to the second return address.

20 Claims, 11 Drawing Sheets

SYSTEMS AND METHODS FOR PROCEDURE RETURN ADDRESS VERIFICATION

TECHNICAL FIELD

The present disclosure is generally related to computer systems, and is specifically related to systems and methods for procedure return address verification.

BACKGROUND

Various return address corrupting techniques may be employed by malicious software for carrying out a return-oriented programming (ROP) attack. ROP is a method of hijacking the execution flow of the current process by exploiting a return instruction which, in many processor architectures, retrieves from the top of the stack the address of the next instruction to be executed, usually being the instruction following the corresponding call instruction within the calling routine. Thus, by modifying the return address on the stack, an attacker can divert the execution flow of the current process to an arbitrary memory location. Having hijacked the execution flow, the attacker can, for example, initialize the arguments and perform a library function call. This technique is known as "return-into-library." In another example, the attacker can locate within the code segment several instruction sequences to be executed. This approach is known as "borrowed code chunks technique."

A variety of methods can be exploited by the attacker for the initial stack corruption, which is also referred to as "stack pivoting." For example, the buffer overflow method involves supplying more input data than the routine is expecting to receive, under the assumption that the input buffer is located on the stack.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
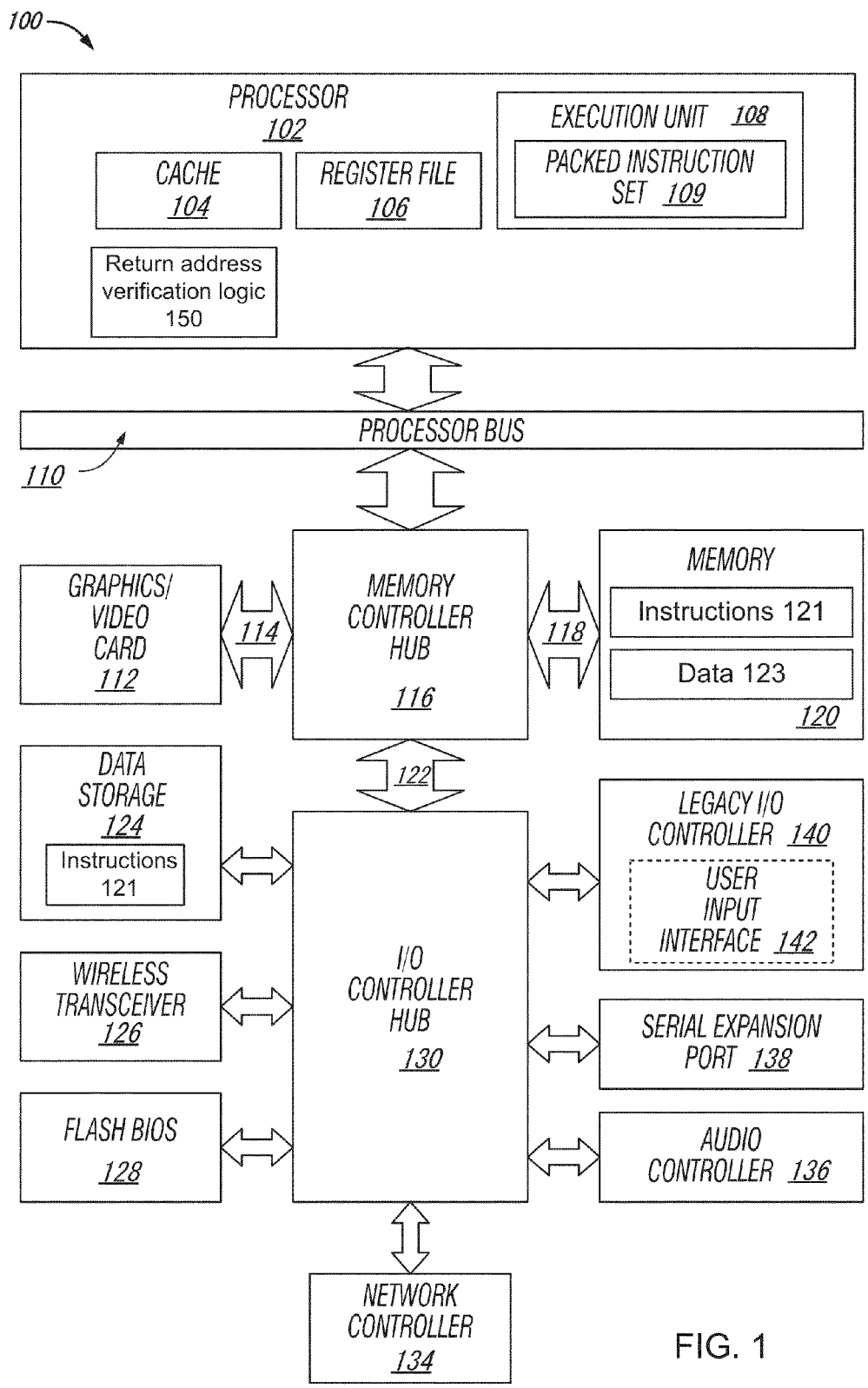
FIG. 1 depicts a high-level component diagram of an example computer system, in accordance with one or more aspects of the present disclosure.

Described herein are computer systems and related methods for procedure return address verification. Unauthorized stack modification, or pivoting, may be used by a potential attacker in attempting a return-oriented programming (ROP) attack. The latter may involve unauthorized modification of a procedure return address stored on the stack in order to divert the execution flow of the current process to an arbitrary memory location. A variety of methods can be exploited by the attacker for unauthorized stack modification. For example, the buffer overflow method involves supplying more input data than the routine is expecting to receive, under the assumption that the input buffer is located on the stack.

To prevent unauthorized stack modification, a computer system may maintain a return address buffer designed to redundantly store, along with the computer system stack, procedure return addresses. Responsive to receiving a call instruction, a processor of the computer system may place the return address both onto a stack and into the return address buffer. Responsive to receiving a return instruction, the processor may retrieve and compare the return addresses from the stack and the return address buffer. Should the two addresses match, the processor may continue executing the return instruction; otherwise, the processor may generate an exception, thus preventing a potential attacker from hijacking the execution flow of the current process. Various aspects of the above referenced methods and systems are described in details herein below by way of examples, rather than by way of limitation.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation in order to provide a thorough understanding of the present disclosure. It will be apparent, however, to one skilled in the art that these specific details need not be employed to practice the methods disclosed herein. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following embodiments are described with reference to a processor, other embodiments are applicable to other types of integrated circuits and logic devices. Similar techniques and teachings of embodiments described herein can be applied to other types of circuits or semiconductor devices that can benefit from higher pipeline throughput and improved performance. The teachings of embodiments described herein are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments described herein rather than to provide an exhaustive list of all possible implementations of embodiments described herein.

Although the below examples describe instruction handling and distribution in the context of execution units and logic circuits, other embodiments of the systems and methods described herein can be accomplished by way of a data or instructions stored on a machine-readable, tangible medium, which when performed by a machine cause the machine to perform functions consistent with at least one embodiment described herein. In one embodiment, functions associated with embodiments described herein are embodied in machine-executable instructions. The instructions can be used to cause a general-purpose or special-purpose processor that is programmed with the instructions to perform the methods described herein. Embodiments described herein may be provided as a computer program product or software which may include a machine or computer-readable medium having stored thereon instructions which may be used to program a computer (or other electronic devices) to perform one or more operations according to embodiments described herein. Alternatively, operations of embodiments described herein might be performed by specific hardware components that contain fixed-function logic for performing the operations, or by any combination of programmed computer components and fixed-function hardware components.

Instructions used to program logic to perform the methods described herein can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may include one or more processor cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

FIG. 1 depicts a high-level component diagram of one example of a computer system in accordance with one or more aspects of the present disclosure. A computer system 100 may include a processor 102 to employ execution units including logic to perform algorithms for processing data, in accordance with the embodiment described herein. System 100 is representative of processing systems based on the PENTIUM III™ PENTIUM 4™, Xeon™, and/or Itanium microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments described herein are not limited to any specific combination of hardware circuitry and software.

Embodiments are not limited to computer systems. Alternative embodiments of the systems and methods described herein can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 102 includes one or more execution units 108 to implement an algorithm that is to perform at least one instruction. One embodiment may be described in the context of a single processor desktop or server system, but alternative embodiments may be included in a multiprocessor system. System 100 is an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that transmits data signals between the processor 102 and other components in the system 100. The elements of system 100 (e.g. graphics accelerator 112, memory controller hub 116, memory 120, I/O controller hub 130, wireless transceiver 126, Flash BIOS 128, Network controller 134, Audio controller 136, Serial expansion port 138, I/O controller 140, etc.) perform their conventional functions that are well known to those familiar with the art.

In one embodiment, the processor 102 includes a Level 1 (L1) internal cache 104. Depending on the architecture, the processor 102 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 102. The processor 102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 102. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time. Alternate embodiments of an execution unit 108 may also be used in micro controllers, embedded processors, graphics devices, DSPs, and other types of logic circuits.

In certain implementations, the processor 102 may further include a lower stack bound register 421, an upper stack bound register 423, and a return address verification logic 150. In one illustrative example, the processor 102 may include a pair of stack bound registers for each of two or more modes of operation, e.g., the 32-bit user mode, the 64-bit user mode, and the supervisor mode. The functioning of the return address verification logic 150 is described in details herein below.

System 100 includes a memory 120. Memory 120 includes a dynamic random access memory (DRAM) device, a static random access memory (SRAM) device, flash memory device, or other memory device. Memory 120 stores instructions 121 and/or data 123 represented by data signals that are to be executed by the processor 102. In certain implementations, instructions 121 may include instructions employing the return address verification logic 150 for detecting an attempted stack bounds violation, as described in more details herein below.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage device 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device. The data storage device 124 can store executable instructions for execution by the processor 102. In certain implementations, instructions 121 may include instructions employing the return address verification logic 150 for detecting an attempted stack bounds violation, as described in more details herein below.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2:
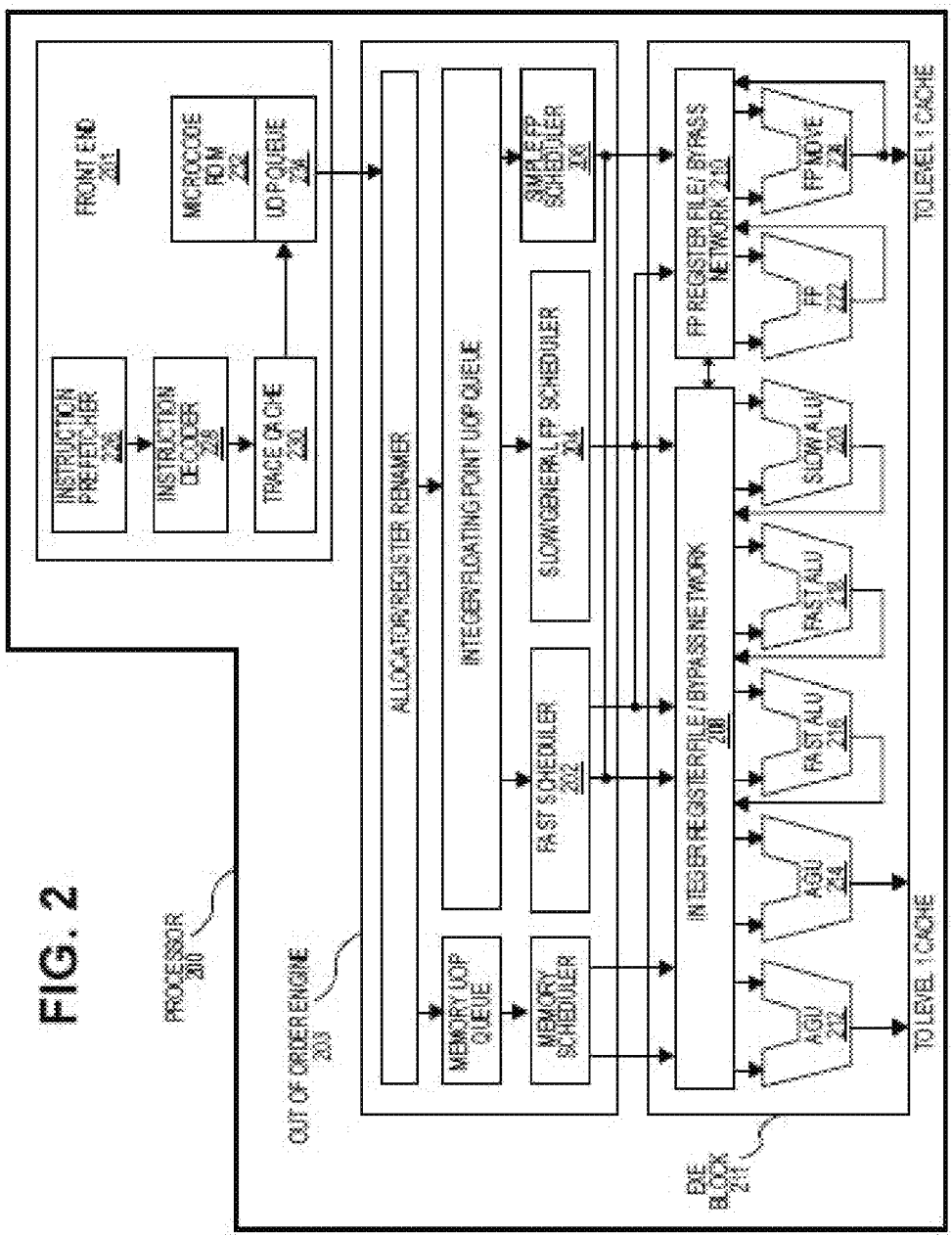
FIG. 2 depicts a block diagram of a processor, in accordance with one or more aspects of the present disclosure.

FIG. 2 is a block diagram of the micro-architecture for a processor 200 that includes logic circuits to perform instructions in accordance with one or more aspects of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also referred to as uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the microcode ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register aliasing logic maps logical registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Physical register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For systems and methods described herein, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In one embodiment, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register aliasing, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3:
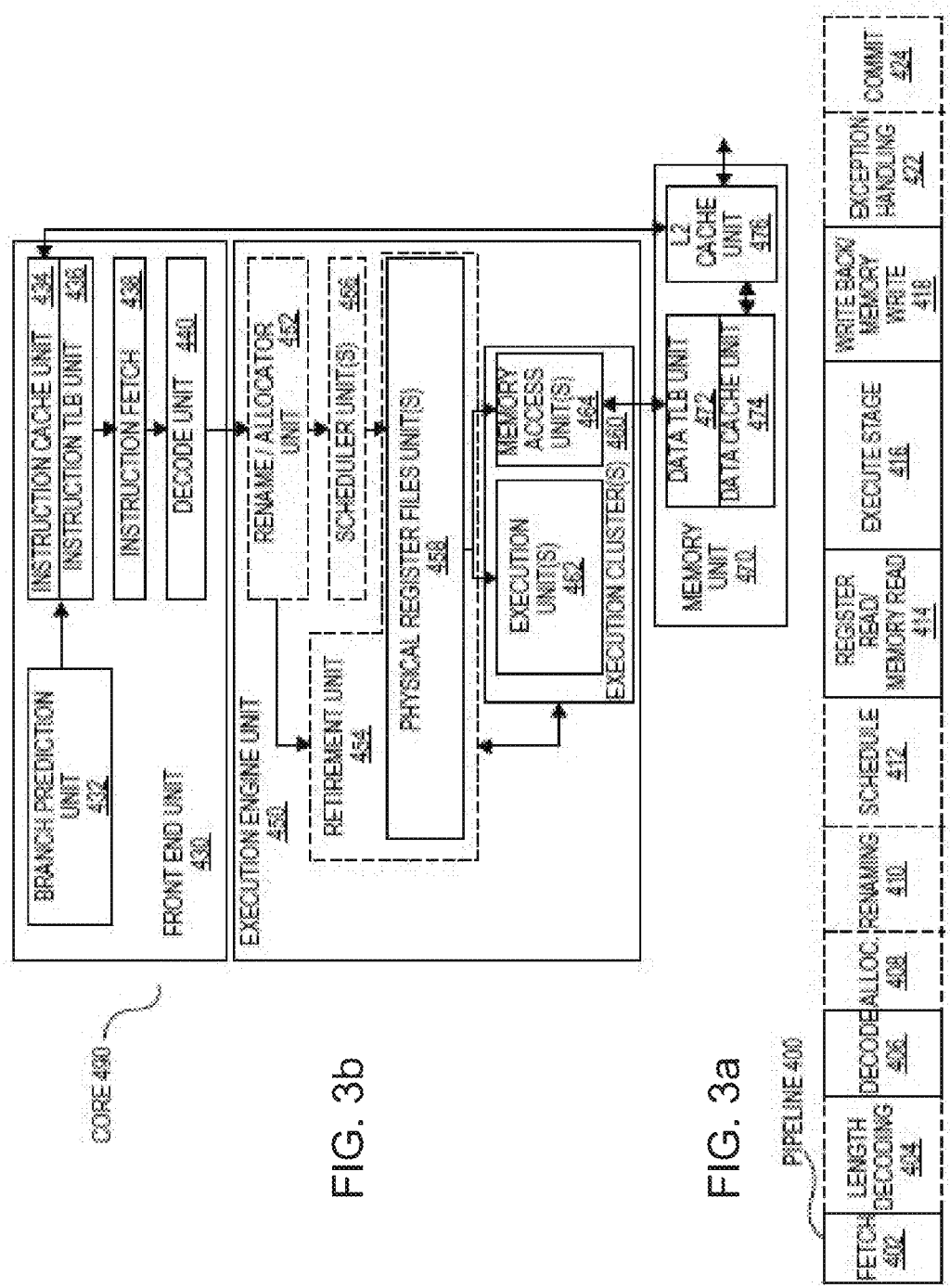
FIGS. 3a-3b schematically illustrates elements of a processor micro-architecture, in accordance with one or more aspects of the present disclosure.

FIGS. 3a-3b schematically illustrates elements of a processor micro-architecture, in accordance with one or more aspects of the present disclosure. In FIG. 3a, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 3b, arrows denote a coupling between two or more units and the direction of the arrow indicates a direction of data flow between those units. FIG. 3b shows processor core 490 including a front end unit 430 coupled to an execution engine unit 450, and both are coupled to a memory unit 470.

The core 490 may be a reduced instruction set computing (RISC) core, a complex instruction set computing (CISC)

core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register aliasing and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various types of registers are suitable as long as they are capable of storing and providing data as described herein. Examples of suitable registers include, but are not limited to, dedicated physical registers, dynamically allocated physical registers using register aliasing, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register aliasing, out-of-order issue/execution core architecture may implement the pipeline 400 as follows: the instruction fetch 438 performs the fetch and length decoding stages 402 and 404; the decode unit 440 performs the decode stage 406; the rename/allocator unit 452 performs the allocation stage 408 and renaming stage 410; the scheduler unit(s) 456 performs the schedule stage 412; the physical register file(s) unit(s) 458 and the memory unit 470 perform the register read/memory read stage 414; the execution cluster 460 perform the execute stage 416; the memory unit 470 and the physical register file(s) unit(s) 458 perform the write back/memory write stage 418; various units may be involved in the exception handling stage 422; and the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

In certain implementations, the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4:
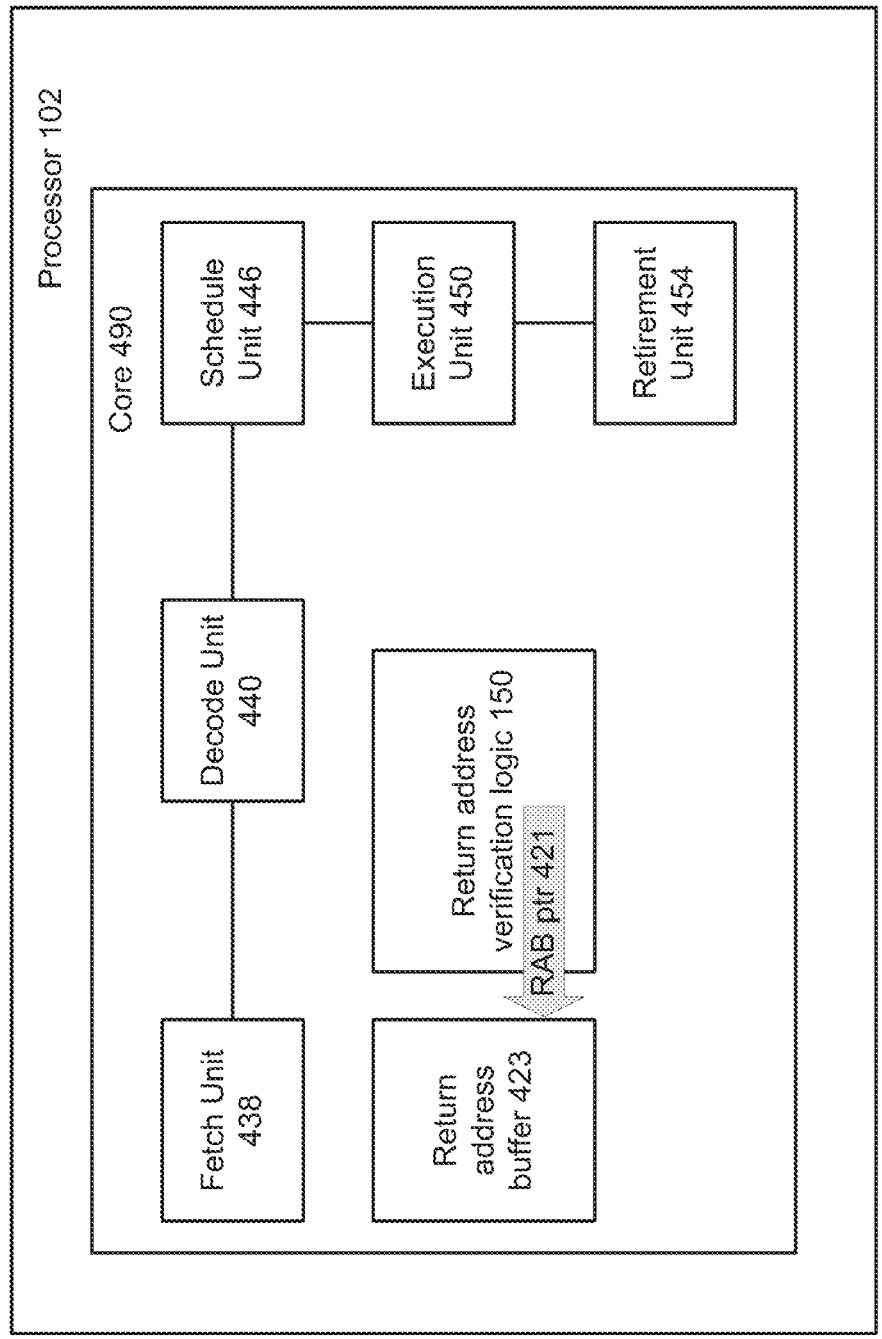
FIG. 4 schematically illustrates several aspects an example processor and other components of the example computer system 100 of FIG. 1, in accordance with one or more aspects of the present disclosure.

FIG. 4 illustrates a block diagram of an example processor 102 of the computer system 100, in accordance with one or more aspects of the present disclosure. Referring to FIG. 4, the processor core 490 may include a fetch unit 202 to fetch instructions for execution by the core 490. The instructions may be fetched from one or more storage devices, such as the memory 115. The processor core 490 may further include a decode unit 440 to decode a fetched instruction into a one or more micro-operations (μops). The processor core 490 may further include a schedule unit 446 to store a decoded instruction received from the decode unit 440 until the instruction is ready to be issued, e.g., until the operand values for the decoded instruction become available. The schedule unit 446 may schedule and/or issue decoded instructions to an execution unit 450.

The execution unit 450 may include one or more arithmetic and logic units (ALUs), one or more integer execution units, one or more floating-point execution unit, and/or other execution units. In certain implementations, the execution unit 450 may execute instructions out-of-order (OOO). The processor core 490 may further include a retirement unit 454 to retire executed instructions after they are committed.

In certain implementations, the processor 102 may further comprise a return address verification logic 150 designed to verify procedure return addresses in order to prevent unauthorized stack pivoting. The return address verification logic 150 may include a return address buffer pointer 421 configured to reference an element of a return address buffer 423. Even though in FIG. 4 the return address buffer 423, the return address buffer pointer 421, and the logic 150 are shown to be inside a core 490, at least some of the above noted elements may be provided elsewhere in the computer system 100. For example, the return address buffer 423 may partially reside within a memory which is external relatively to the processor 102. Furthermore, the return address buffer 423, the return address buffer pointer 421, the logic 150 and/or some of their respective components may be shared among a plurality of processor cores.

Numerous programming languages support a notion of procedure, which is a unit of code having an entry point and at least one return instruction. A procedure may be initiated by a call instruction executed within another procedure. A return instruction may cause a processor to switch the flow of execution back to the calling procedure (e.g., to the instruction following the corresponding call instruction within the calling procedure). In certain processor architectures, the return address and/or the parameters being passed to a procedure may be stored on a stack, the latter referring to a data structure within a computer system memory. A stack may be represented by a linear array supporting the "last in-first out" (LIFO) access paradigm, as schematically illustrated by FIG. 5.

Figure 5:
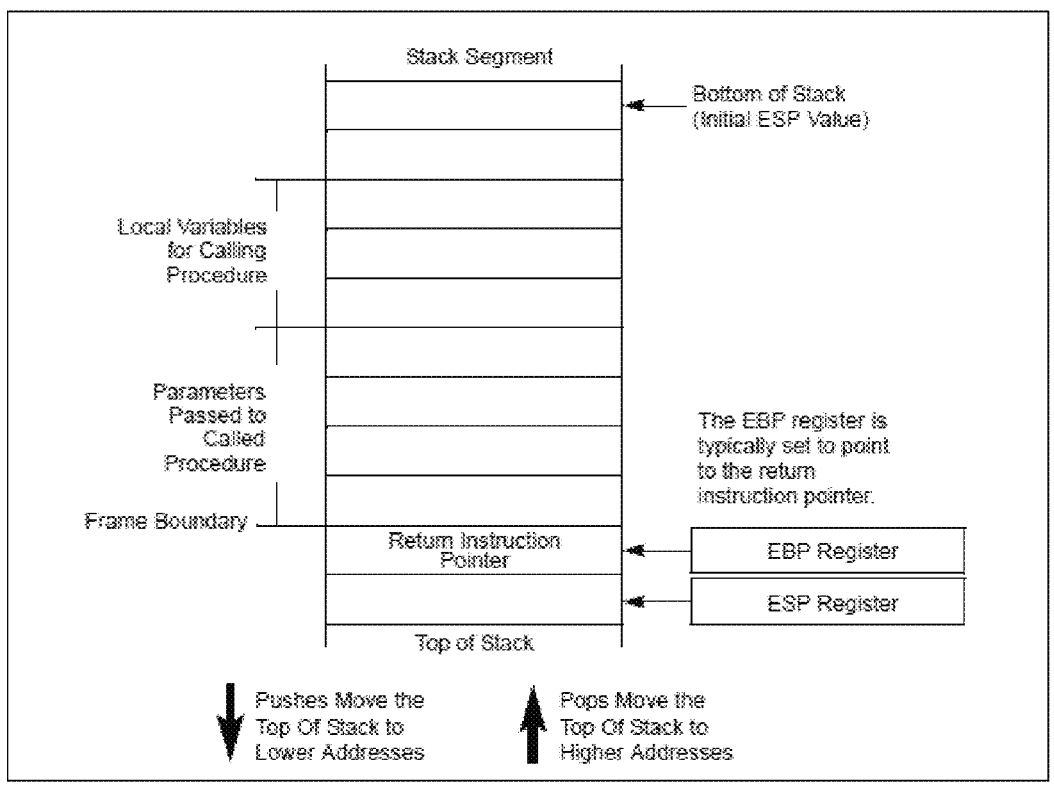
FIG. 5 schematically illustrates one example of memory layout of the computer system stack, in accordance with one or more aspects of the present disclosure.

In the illustrative example of FIG. 5, the stack grows towards the lesser memory addresses. Data items may be placed on the stack using PUSH instruction and retrieved from the stack using the POP instruction. To place a data item on the stack, the processor may modify (e.g., decrement) the value of a stack pointer and then copy the data item into the memory location referenced by the stack pointer. Hence, the stack pointer always references the top-most element of the stack. To retrieve a data item from the stack, the processor 102 may read the data item referenced by the stack pointer, and then modify (e.g., increment) the value of the stack pointer so that it would reference the element which was placed on the stack immediately before the element that is being retrieved. In certain processor architectures, the stack pointer may be stored in a dedicated processor register, referred to as SP or ESP.

The processor 102 may employ several segment registers to support a memory segmentation mechanism. In certain implementations, the processor 102 may further support typing of memory segments, in order to restrict the memory access operations that may be performed on a particular type of segment. Segment typing may be supported by associating memory types with segment registers. In one example, the processor 102 may include at least one code segment register (which may also be referred to as CS), two or more data segment registers (which may also be referred to as DS, ES, FS, and GS), and at least one stack segment register (which may also be referred to as SS).

When executing a call instruction, the processor 102 may, prior to branching to the first instruction of the called procedure, push the address stored in the instruction pointer (EIP) register onto the current stack. This address, also referred to as the return instruction pointer, points to the instruction where execution of the calling procedure should resume following a return from the called procedure. When executing a return instruction within the called procedure, the processor 102 may retrieve the return instruction pointer from the stack back into the EIP register, and thus resume execution of the calling procedure.

It should be noted that in certain implementations, the processor 102 does not require that the return instruction pointer point back to the calling procedure. Prior to executing the return instruction, the return instruction pointer stored in the stack can be manipulated by software (e.g., by executing a PUSH instruction) to point to an arbitrary address.

To prevent exploiting this behavior by a potential attacker to divert the execution flow to an arbitrary memory location, the processor 102 may, responsive to receiving a call instruction, store the return instruction pointer not only on the stack, but also in the return address buffer 423. Responsive to receiving a return instruction within the called procedure, the processor 102 may retrieve and compare the return instruction pointers from the stack and from the return address buffer. Should the two addresses match, the processor may continue executing the return instruction; otherwise, the processor may generate an exception.

Figure 6:
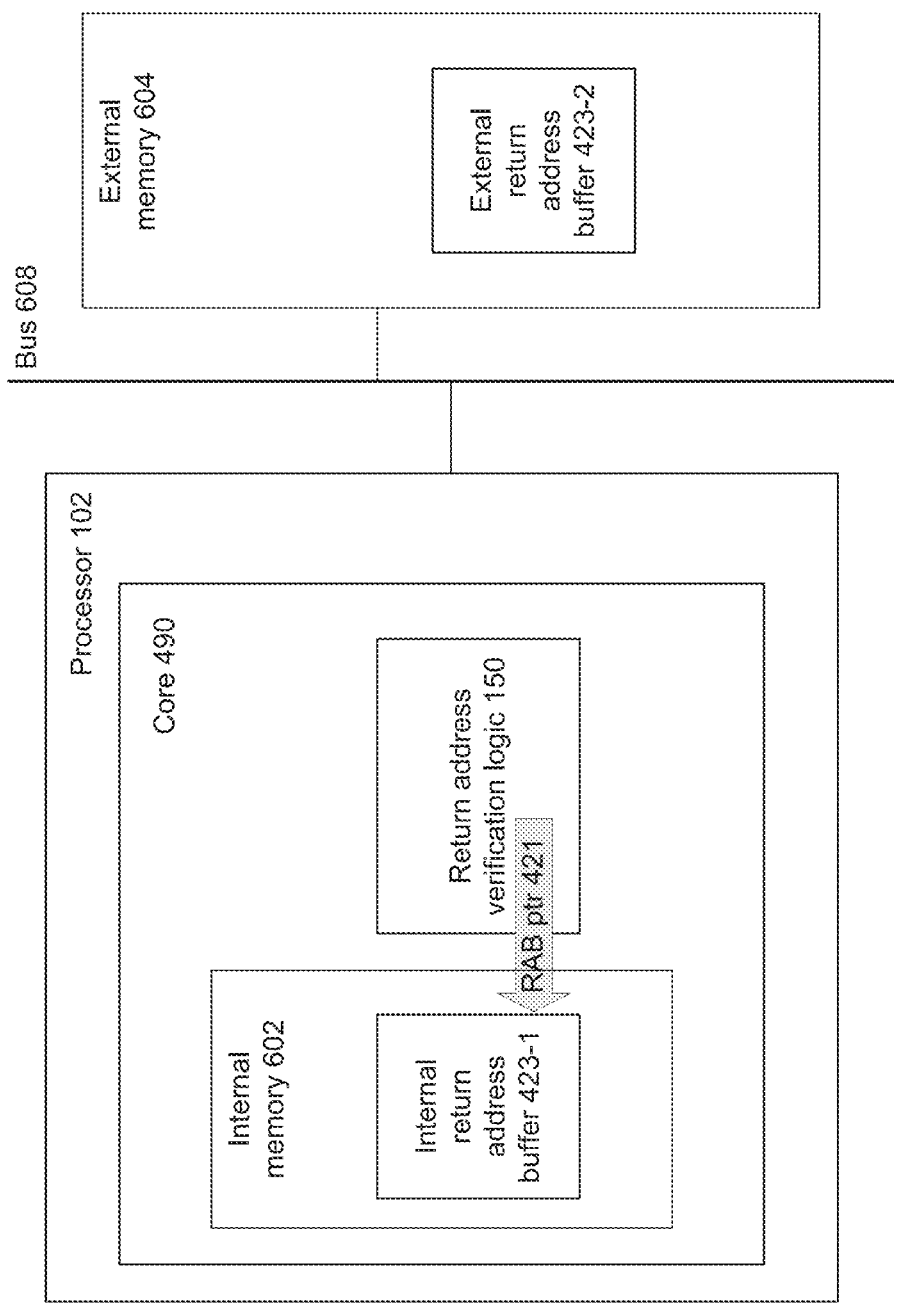
FIG. 6 schematically illustrates one example of memory layout of the return address buffer, in accordance with one or more aspects of the present disclosure.

In certain implementations, the return address buffer 423 may comprise a first buffer 423-1 stored within the internal memory 602 of the processor 102 and a second buffer 423-2 stored within the external memory 604 which may communicatively coupled to the processor 102 via a system bus 608, as schematically illustrated by FIG. 6. The second buffer 423-2 residing in the external memory 604 may be used as an "overflow" buffer, should the size of the primary buffer 423-1 become insufficient to store the return addresses.

To implement the "overflow" functionality, in one illustrative example, the return address buffer pointer 421 may be initialized to point to the base of the internal return address buffer 423-1, and may be modified (e.g., decremented) when a new return address is placed into the return address buffer 423. When the boundary of the internal buffer 423-1 is reached, the next pointer modification operation may cause the return address buffer pointer 421 to point to the base of the external return address buffer 423-2. Similar functionality may be implemented for switching the return address buffer pointer 421 from the external buffer 423-2 to the internal buffer 423-1 responsive to removing a return address from the buffer 423.

In certain implementations, at least part of the external return address buffer 423-2 can be cached by one or more caches 104 of the processor 102, such as L2 cache and/or L1 cache. In one illustrative example, a plurality of cache entries in the lowest level data cache of the processor 102 may be reserved for caching a plurality of entries of the external return address buffer 423-2.

In another aspect, the memory hosting the external memory buffer 423-2 may be configured to only allow access by privileged code, by employing the processor's memory protection mechanism providing several access privilege levels. In one example, the access privilege levels, also referred to as protection rings, may be numbered from 0 to 3, and the greater numbers may mean lesser privileges. Protection ring 0 may be reserved for segments containing the most privileged code, data, and stacks, such as those of a kernel of an operating system. Outer protection rings may be used for application programs. In certain implementations, operating systems may use a subset of the plurality of the protection rings, e.g., ring 0 for the operating system kernel, and ring 3 for applications. The processor may use privilege levels to prevent a process operating at a lesser privilege level from accessing a segment with a greater privilege. The current privilege level (CPL) is the privilege level of the currently executing process. The CPL may be stored in bits 0 and 1 of the CS and SS segment registers. The CPL may be equal to the privilege level of the code segment from which instructions are being fetched. The processor may change CPL when the program control is transferred to a code segment with a different privilege level. The processor may perform privilege level check by comparing the CPL with the privilege level of a segment or a call gate being accessed (descriptor privilege level, DPL) and/or the requested privilege level (RPL) assigned to a segment selector being accessed. When a processor detects a privilege level violation, it may generate a general protection exception.

Thus, in one illustrative example, the memory hosting the external memory buffer 423-2 may be configured to only allow access by privileged code, such as the operating system kernel having a current privilege level (CPL) of 0. Alternatively, the memory hosting the external memory buffer 423-2 may be configured to only allow read-only access, and thus can only be modified by the return address verification logic 150.

As noted herein above, responsive to receiving a call instruction, the processor 102 may, prior to branching to the first instruction of the called procedure, push the address stored in the instruction pointer (EIP) register onto the current stack and in the return address buffer 423. When executing a return instruction within the called procedure, the processor 102 may retrieve and compare the return instruction pointers from the stack and from the return address buffer. Should the two addresses match, the processor may continue executing the return instruction; otherwise, the processor may generate an exception.

In a further aspect, depending upon the processor architecture and/or the operating system, the call stack may legitimately be modified by means other than a call instruction. For example, setjump/longjump functions of the standard C library provide the ability to reestablish a program state, including the instruction pointer, even across multiple levels of procedure calls. In another example, a return instruction may be used to transfer control to a dynamically computed entry point, e.g., by pushing the dynamically computed address onto the stack. To allow for correct handling of these and other situations when the call stack is legitimately modified by means other than a call instruction, the processor 102 may provide an alternative (i.e., other than executing a call instruction) mechanism for modifying the return address buffer contents and/or return address buffer pointer.

Thus, in certain implementations, the processor 102 may have an instruction set including a return address buffer pointer modification instruction and/or a return address buffer modification instruction. Responsive to receiving a return address buffer pointer modification instruction, the processor 102 may modify (e.g., increment or decrement) the return address buffer pointer without modifying the contents of the return address buffer. Responsive to receiving a return address buffer pointer modification instruction, the processor 102 may modify the return address buffer contents (e.g., store a new return address in the buffer or remove a return address from the buffer), and may further accordingly modify (e.g., increment or decrement) the return address buffer pointer. In certain implementations, the return address buffer pointer modification instruction and/or the return address buffer modification instruction may be privileged instructions, e.g., executable only by a ring 0 process or thread, thus preventing unauthorized return address buffer modification by a user process or thread.

Figure 7:
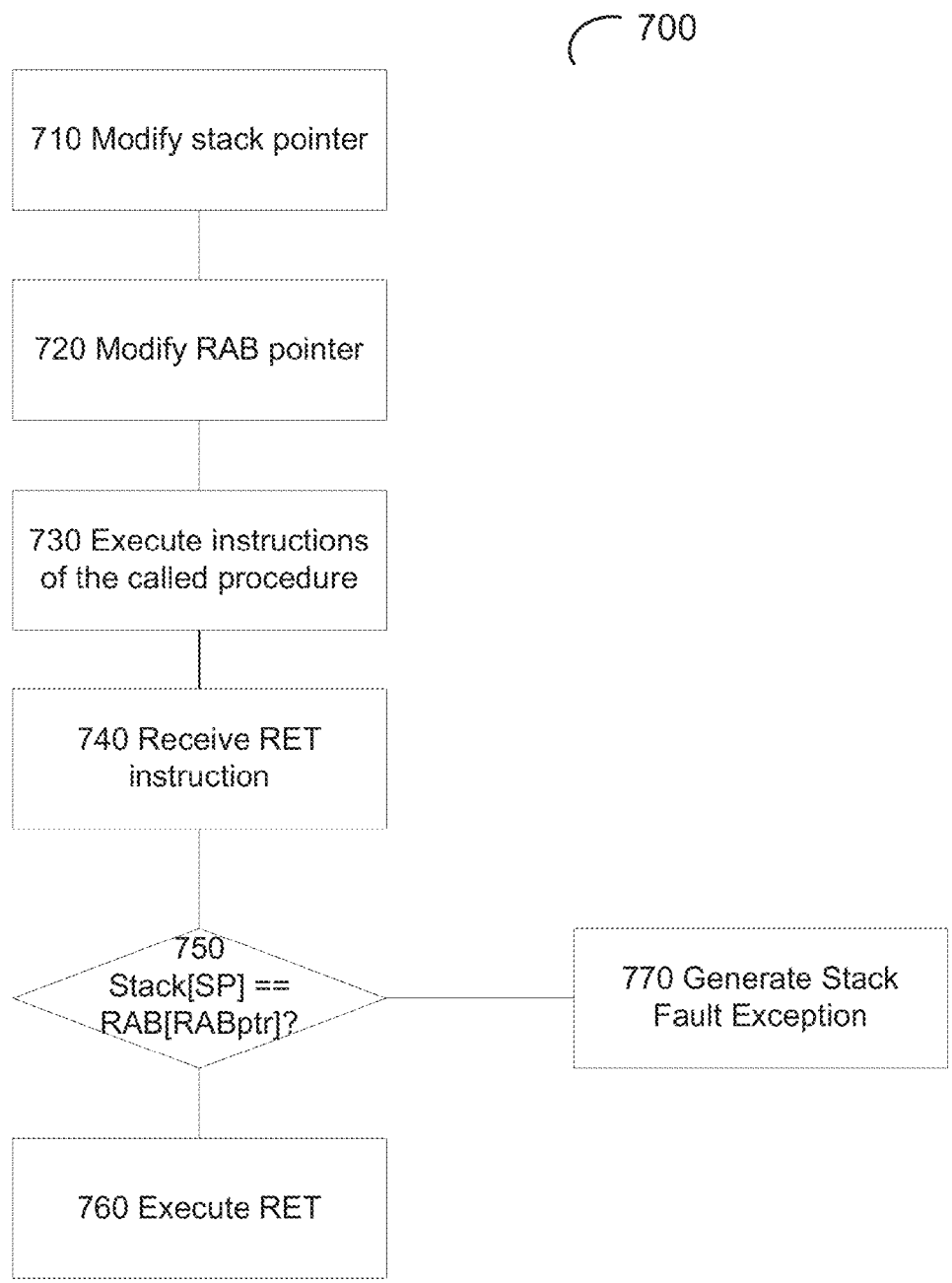
FIG. 7 depicts a flow diagram of an example method for detecting unauthorized stack pivoting, in accordance with one or more aspects of the present disclosure.

FIG. 7 depicts a flow diagram of an example method for procedure return address verification, in accordance with one or more aspects of the present disclosure. The method 700 may be performed by a computer system that may comprise hardware (e.g., circuitry, dedicated logic, and/or programmable logic), software (e.g., instructions executable on a computer system to perform hardware simulation), or a combination thereof. The method 700 and/or each of its functions, routines, subroutines, or operations may be performed by one or more physical processors of the computer system executing the method. Two or more functions, routines, subroutines, or operations of method 700 may be performed in parallel or in an order which may differ from the order described above. In one example, as illustrated by FIG. 7, the method 700 may be performed by the computer system 100 of FIG. 1.

Referring to FIG. 7, at block 710, the processor of the computer system 100 may modify a stack pointer. In one example, the processor may modify the stack pointer by placing a return address onto the stack responsive to receiving a call instruction, as described in more details herein above. Alternatively, the processor may directly modify the stack, e.g., by pushing onto the stack a dynamically computed return address, as described in more details herein above.

At block 720, the processor may modify a return address buffer pointer. In one example, the processor may modify the return address buffer pointer by placing a return address into the return address buffer responsive to receiving a call instruction, as described in more details herein above. Alternatively, the processor may directly modify the return address buffer in order to reflect a direct modification of the stack e.g., when a dynamically computed return address has been pushed onto the stack, as described in more details herein above.

At block 730, the processor may optionally execute one or more instructions, e.g., of the procedure having been called by the call instruction which caused modifications to the stack and to the return address buffer pointer referenced by the blocks 710-720.

At block 740, the processor may receive a return (RET) instruction.

Responsive to establishing, at block 750, that the return address referenced by the stack pointer is equal to the return address referenced by the return address buffer pointer, the processor may execute the RET instruction, schematically referenced by block 760, by storing the return instruction pointer from the stack into the EIP register in order to resume execution of the calling procedure.

Responsive to establishing, at block 750, that the return address referenced by the stack pointer does not match the return address referenced by the return address buffer pointer, the processor may generate a Stack Fault exception.

The methods and systems described herein above may be implemented by computer system of various architectures, designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable to implement the methods described herein. In general, a large variety of systems or electronic devices capable of incorporating a processor and/or other execution logic as disclosed herein are generally suitable for implementing the systems and methods described herein.

Figure 8:
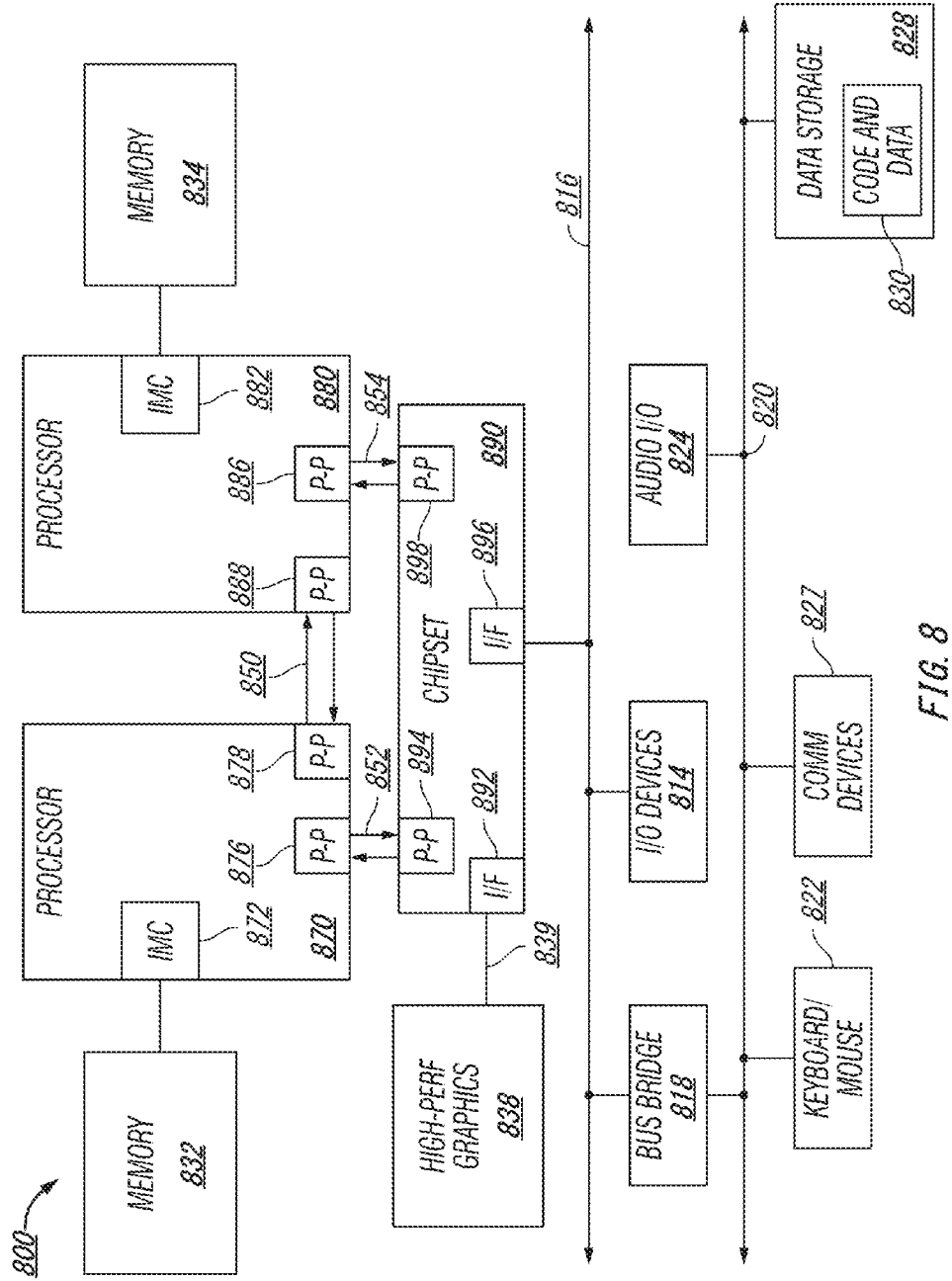
FIG. 8 depicts a block diagram of an example computer system, in accordance with one or more aspects of the present disclosure.

FIG. 8 depicts a block diagram of an example computer system, in accordance with one or more aspects of the present disclosure. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 102 capable of performing return address verification, as described in more details herein above. While shown with only two processors 870, 880, it is to be understood that the scope of the present disclosure is not so limited. In other embodiments, one or more additional processors may be present in the example computer system.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 750 using P-P interface circuits 878, 888. As shown in FIG. 7, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820.

Figure 9:
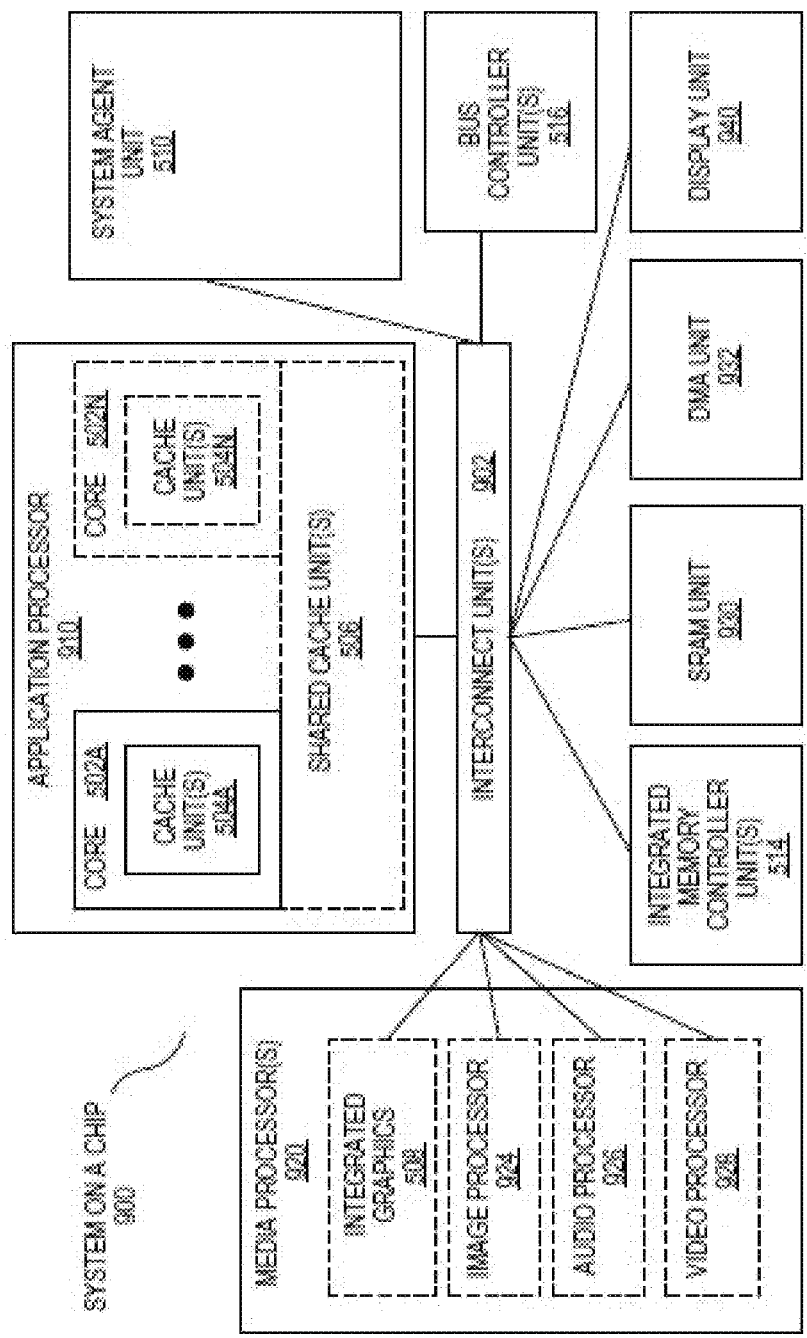
FIG. 9 depicts a block diagram of an example system on a chip (SoC), in accordance with one or more aspects of the present disclosure.

FIG. 9 depicts a block diagram of an example system on a chip (SoC), in accordance with one or more aspects of the present disclosure. The application processor 910 may be capable of performing return address verification, as described in more details herein above. As schematically illustrated by FIG. 9, interconnect unit(s) 902 may be coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
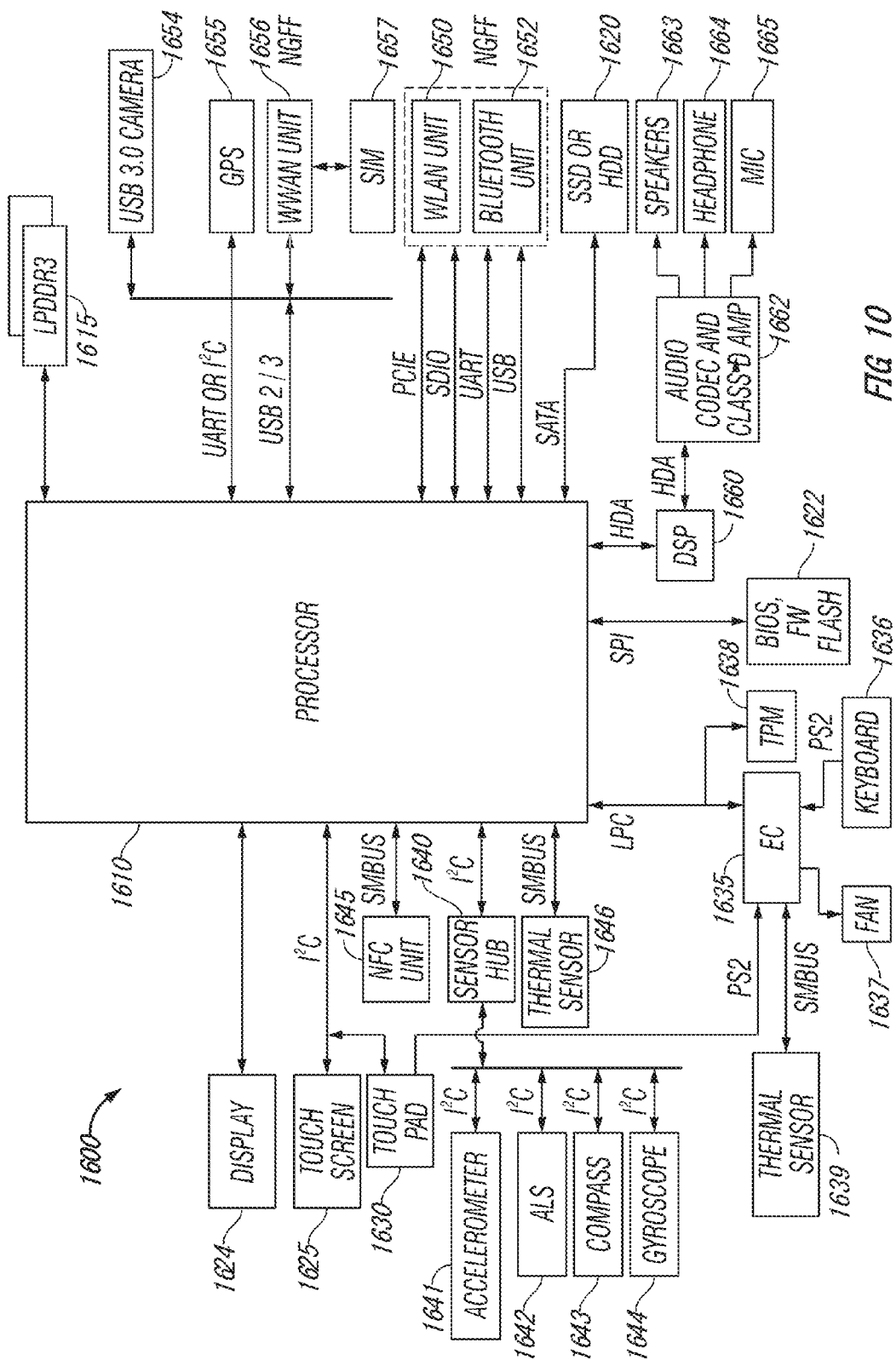
FIG. 10 depicts a block diagram of an example computer system, in accordance with one or more aspects of the present disclosure.

FIG. 10 depicts a block diagram of an example computer system, in accordance with one or more aspects of the present disclosure. Processor 1610 may be provided by some version of the processor 102 capable of performing return address verification, as described in more details herein above.

The system 1600 schematically illustrated by FIG. 10 may include any combination of components implemented as ICs, portions thereof, discrete electronic devices, or other modules, logic, hardware, software, firmware, or a combination thereof adapted in a computer system, or as components otherwise incorporated within a chassis of the computer system. The block diagram of FIG. 10 is intended to show a high level view of many components of the computer system. However, it is to be understood that some of the components shown may be omitted, additional components may be present, and different arrangement of the components shown may occur in other implementations.

Processor 1610 may be provided by a microprocessor, multi-core processor, multithreaded processor, an ultra low voltage processor, an embedded processor, or other known processing element. In the illustrated implementation, processor 1610 acts as a main processing unit and central hub for communication with many of the various components of the system 1600. As one example, processor 1600 may be implemented as a system on a chip (SoC). As a specific illustrative example, processor 1610 includes an Intel® Architecture Core™-based processor such as an i3, i5, i7 or another such processor available from Intel Corporation, Santa Clara, Calif.

Processor 1610 may communicate with a system memory 1615. In various implementations the individual memory devices may be of different package types such as single die package (SDP), dual die package (DDP) or quad die package (1P). These devices, in some implementations, may be directly soldered onto a motherboard to provide a lower profile solution, while in other implementations the devices may be configured as one or more memory modules that in turn couple to the motherboard by a given connector. Other memory implementations are possible, such as other types of memory modules, e.g., dual inline memory modules (DIMMs) of different varieties including but not limited to microDIMMs, MiniDIMMs. In one illustrative example, the memory may be sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1620 may be also coupled to processor 1610. In certain implementations, to enable a thinner and lighter system design as well as to improve system responsiveness, the mass storage 1620 may be implemented via a SSD. In other implementations, the mass storage may primarily be provided by a hard disk drive (HDD) with a smaller amount of SSD storage to act as a SSD cache to enable non-volatile storage of context state and other such information during power down events so that a fast power up can occur on re-initiation of system activities.

Also shown in FIG. 10, a flash device 1622 may be coupled to processor 1610, e.g., via a serial peripheral interface (SPI). The flash device 1622 may provide for non-volatile storage of system software, including a basic input/output software (BIOS) as well as other firmware of the system.

In various implementations, the mass storage of the system may be provided by a SSD alone or as a disk, optical or other drive with an SSD cache. In some implementations, the mass storage may be provided by an SSD or as a HDD along with a restore (RST) cache module. The SSD cache may be configured as a single level cache (SLC) or multi-level cache (MLC) option to provide an appropriate level of responsiveness.

Various input/output (IO) devices may be present within system 1600, including, e.g., a display 1624 which may be provided by a high definition LCD or LED panel configured within a lid portion of the chassis. This display panel may also provide for a touch screen 1625 adapted externally over the display panel such that via a user's interaction with this touch screen, user inputs can be provided to the system to enable desired operations, e.g., with regard to the display of information, accessing of information and so forth. In certain implementations, display 1624 may be coupled to processor 1610 via a display interconnect that can be implemented as a high performance graphics interconnect. Touch screen 1625 may be coupled to processor 1610 via another interconnect, which in an embodiment can be an I2C interconnect. In addition to touch screen 1625, user input by way of touch can also occur via a touch pad 1630 which may be configured within the chassis and may also be coupled to the same I2C interconnect as touch screen 1625.

Various sensors may be present within the system and may be coupled to processor 1610 in different manners. Certain inertial and environmental sensors may couple to processor 1610 through a sensor hub 1640, e.g., via an I2C interconnect. These sensors may include an accelerometer 1641, an ambient light sensor (ALS) 1642, a compass 1643 and a gyroscope 1644. Other environmental sensors may include one or more thermal sensors 1646 which in some embodiments couple to processor 1610 via a system management bus (SMBus) bus. In certain implementations, one or more infrared or other heat sensing elements, or any other element for sensing the presence or movement of a user may be present.

Various peripheral devices may couple to processor 1610 via a low pin count (LPC) interconnect. In certain implementations, various components can be coupled through an embedded controller 1635. Such components can include a keyboard 1636 (e.g., coupled via a PS2 interface), a fan 1637, and a thermal sensor 1639. In some embodiments, touch pad 1630 may also couple to EC 1635 via a PS2 interface. In addition, a security processor such as a trusted platform module (TPM) 1638 in accordance with the Trusted Computing Group (TCG) TPM Specification Version 1.2, dated Oct. 2, 2003, may also couple to processor 1610 via this LPC interconnect.

In certain implementations, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1600 can communicate with external devices in a variety of manners, including wirelessly. In the embodiment shown in FIG. 16, various wireless modules, each of which can correspond to a radio configured for a particular wireless communication protocol, are present. One manner for wireless communication in a short range such as a near field may be via a near field communication (NFC) unit 1645 which may communicate, in one embodiment with processor 1610 via an SMBus.

Additional wireless units can include other short range wireless engines including a WLAN unit 1650 and a Bluetooth unit 1652. Using WLAN unit 1650, WiFi™ communications in accordance with a given Institute of Electrical and Electronics Engineers (IEEE) 802.11 standard can be realized, while via Bluetooth unit 1652, short range communications via a Bluetooth protocol can occur. These units may communicate with processor 1610 via, e.g., a USB link or a universal asynchronous receiver transmitter (UART) link. Or these units may couple to processor 1610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1656 which in turn may couple to a subscriber identity module (SIM) 1657. In addition, to enable receipt and use of location information, a GPS module 1655 may also be present.

To provide for audio inputs and outputs, an audio processor can be implemented via a digital signal processor (DSP) 1660, which may couple to processor 1610 via a high definition audio (HDA) link. Similarly, DSP 1660 may communicate with an integrated coder/decoder (CODEC) and amplifier 1662 that in turn may couple to output speakers 1663 which may be implemented within the chassis. Similarly, amplifier and CODEC 1662 can be coupled to receive audio inputs from a microphone 1665.

Figure 11:
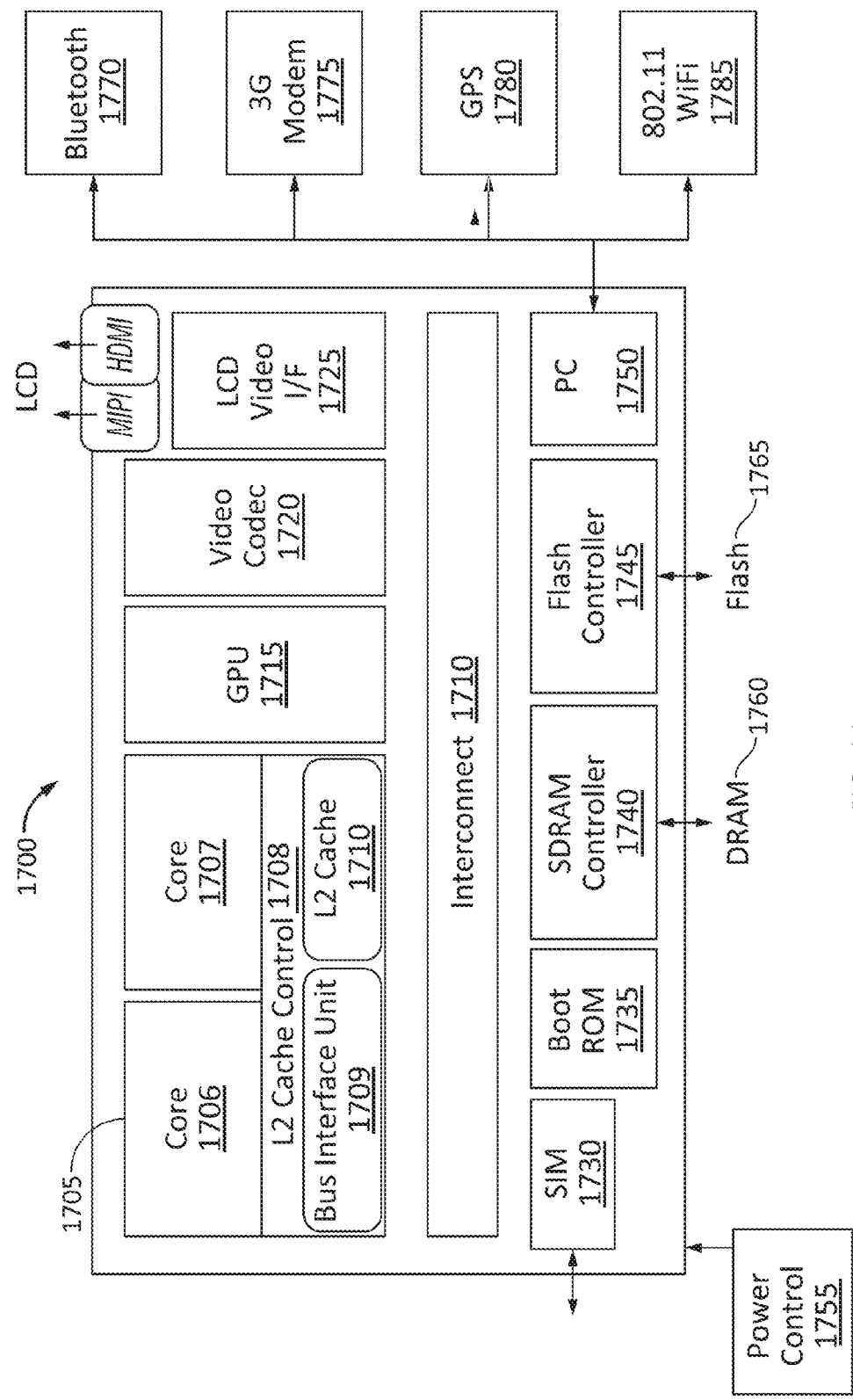
FIG. 11 depicts a block diagram of an example system on a chip (SoC), in accordance with one or more aspects of the present disclosure.

FIG. 11 depicts a block diagram of an example system on a chip (SoC), in accordance with one or more aspects of the present disclosure. As a specific illustrative example, SOC 1700 may be included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

As schematically illustrated by FIG. 11, SOC 1700 may include two cores. Cores 1706 and 1707 may be coupled to cache control 1708 that is associated with bus interface unit 1709 and L2 cache 1710 to communicate with other parts of system 1700. Interconnect 1710 may include an on-chip interconnect, such as an IOSF, AMBA, or other interconnect.

Interface 1710 may provide communication channels to the other components, such as a Subscriber Identity Module (SIM) 1730 to interface with a SIM card, a boot ROM 1735 to hold boot code for execution by cores 1706 and 1707 to initialize and boot SOC 1700, a SDRAM controller 1740 to interface with external memory (e.g., DRAM 1760), a flash controller 1745 to interface with non-volatile memory (e.g., flash 1765), a peripheral control 1550 (e.g., Serial Peripheral Interface) to interface with peripherals, video codecs 1720 and Video interface 1725 to display and receive input (e.g., touch enabled input), GPU 1715 to perform graphics related computations, etc. In addition, the system may comprise peripherals for communication, such as a Bluetooth module 1770, 3G modem 1775, GPS 1785, and WiFi 1785.

Other computer system designs and configurations may also be suitable to implement the systems and methods described herein. The following examples illustrate various implementations in accordance with one or more aspect of the present disclosure.

Example 1 is a processing system, comprising: a stack pointer configured to reference a first return address stored on a stack; a return address buffer pointer configured to reference a second return address stored in a return address buffer; and a return address verification logic configured, responsive to receiving a return instruction, to compare the first return address to the second return address.

In Example 2, the return address verification logic of the processing system of Example 1 may be further configured to execute the return instruction responsive to determining that the first return address is equal to the second return address.

In Example 3, the return address verification logic of the processing system of Example 1 may be further configured to generate a stack fault exception responsive to determining that the first return address differs from the second return address.

In Example 4, the return address verification logic of the processing system of Example 1 may be further configured, responsive to receiving a call instruction, to store a return address on the stack and in the return address buffer.

In Example 5, the return address verification logic of the processing system of Example 1 may be further configured, responsive to receiving a return address buffer modification instruction, to perform at least one of: storing a return address in the return address buffer or removing a return address from the return address buffer.

In Example 6, the return address verification logic of the processing system of Example 1 may be further configured, responsive to receiving a return address buffer pointer modification instruction, to perform at least one of: incrementing the return address buffer pointer or decrementing the return address buffer pointer.

In Example 7, the return address buffer modification instruction of Examples 5-6 may be a privileged instruction.

In Example 8, the stack of the processing system of any of Examples 1-7 may be residing within a memory communicatively coupled to the processing system.

In Example 9, the return address buffer of the processing system of any of Examples 1-7 may be at least partially residing within a memory incorporated into the processing system.

In Example 10, the return address buffer of the processing system of any of Examples 1-7 may comprise a first portion residing within a memory incorporated into the processing system and a second portion residing within an external memory.

In Example 11, the external memory of the processing system of Example 10 may be provided by a read-only memory.

In Example 12, the second portion of the return address buffer of the processing system of any of Examples 10-11 may be configured to operate as an overflow buffer relatively to the first portion.

Example 13 is a method for procedure return address verification, comprising: modifying, by a processing system, a stack pointer; modifying a return address buffer pointer; receiving a return instruction; comparing a first return address referenced by the stack pointer to a second return address referenced by the return address buffer pointer; and executing the return instruction responsive to determining that the first return address is equal to the second return address.

In Example 14, the method of Example 13 may further comprise: generating a stack fault exception responsive to determining that the first return address differs from the second return address.

In Example 15, the method of Example 13 may further comprise: storing a return address on the stack and in the return address buffer responsive to receiving a call instruction.

In Example 16, the method of Example 13 may further comprise: receiving a return address buffer modification instruction; and performing at least one of: storing a return address in the return address buffer or removing a return address from the return address buffer.

In Example 17, the method of Example 13 may further comprise: receiving a return address buffer modification instruction; and performing at least one of: incrementing the return address buffer pointer or decrementing the return address buffer pointer.

In Example 18, the method of Example 13 may further comprise: initializing the return address buffer pointer to point to an internal return address buffer; modifying the return address buffer pointer; determining that a boundary of the internal return address buffer is reached; and causing the return address buffer pointer to point to an external return address buffer.

Example 19 is an apparatus comprising a memory and a processing system coupled to the memory, wherein the processing system is configured to perform the method of any of the Examples 13-18.

Example 20 is a computer-readable non-transitory storage medium comprising executable instructions that, when executed by a processing system, cause the processing system to perform operations, comprising: modifying a stack pointer; modifying a return address buffer pointer; receiving a return instruction; comparing a first return address referenced by the stack pointer to a second return address referenced by a return address buffer pointer; and executing the return instruction responsive to determining that the first return address is equal to the second return address.

In Example 21, the computer-readable non-transitory storage medium of Example 20 may further comprise executable instructions causing the computing system to generate a stack fault exception responsive to determining that the first return address differs from the second return address.

In Example 22, the computer-readable non-transitory storage medium of Example 20 may further comprise executable instructions causing the computing system to store a return address on the stack and in the return address buffer responsive to receiving a call instruction.

In Example 23, the computer-readable non-transitory storage medium of Example 20 may further comprise executable instructions causing the computing system to receive a return address buffer modification instruction, and perform at least one of: storing a return address in the return address buffer or removing a return address from the return address buffer.

In Example 24, the computer-readable non-transitory storage medium of Example 20 may further comprise executable instructions causing the computing system to receive a return address buffer modification instruction, and perform at least one of: incrementing the return address buffer pointer or decrementing the return address buffer pointer.

In Example 25, the computer-readable non-transitory storage medium of Example 20 may further comprise executable instructions causing the computing system to initialize the return address buffer pointer to point to an internal return address buffer; modify the return address buffer pointer; determining that a boundary of the internal return address buffer is reached; and cause the return address buffer pointer to point to an external return address buffer.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

The invention claimed is:

1. A processing system, comprising:
   a stack pointer configured to reference a first return address stored on a stack;
   a return address buffer pointer configured to reference a second return address stored in a return address buffer; and
   a return address verification logic configured to:
      responsive to receiving a return instruction, compare the first return address to the second return address, and
      responsive to receiving a return address buffer modification instruction, perform at least one of: storing a return address in the return address buffer or removing a return address from the return address buffer, wherein the return address buffer modification instruction is a privileged instruction.

2. The processing system of claim 1, wherein the return address verification logic is further configured to execute the return instruction responsive to determining that the first return address is equal to the second return address.

3. The processing system of claim 1, wherein the return address verification logic is further configured to generate a stack fault exception responsive to determining that the first return address differs from the second return address.

4. The processing system of claim 1, wherein the return address verification logic is further configured, responsive to receiving a call instruction, to store a return address on the stack and in the return address buffer.

5. The processing system of claim 1, wherein the return address verification logic is further configured, responsive to receiving a return address buffer pointer modification instruction, to perform at least one of: increment the return address buffer pointer or decrement the return address buffer pointer.

6. The processing system of claim 5, wherein the return address buffer pointer modification instruction is a privileged instruction.

7. The processing system of claim 1, wherein the stack is residing within a memory communicatively coupled to the processing system.

8. The processing system of claim 1, wherein the return address buffer is at least partially residing within a memory incorporated into the processing system.

9. The processing system of claim 1, wherein the return address buffer comprises a first portion residing within a memory incorporated into the processing system and a second portion residing within an external memory.

10. The processing system of claim 9, wherein the external memory is provided by a read-only memory.

11. The processing system of claim 9, wherein the second portion is configured to operate as an overflow buffer relatively to the first portion.

12. A method, comprising:
   initializing a return address buffer pointer to point to an internal return address buffer;
   modifying, by a processing system, a stack pointer;
   modifying the return address buffer pointer;
   responsive to determining that a boundary of the internal return address buffer is reached, causing the return address buffer pointer to point to an external return address buffer;
   responsive to receiving a return instruction, comparing a first return address referenced by the stack pointer to a second return address referenced by the return address buffer pointer; and
   executing the return instruction responsive to determining that the first return address is equal to the second return address.

13. The method of claim 12, further comprising generating a stack fault exception responsive to determining that the first return address differs from the second return address.

14. The method of claim 12, further comprising storing a return address on the stack and in the return address buffer responsive to receiving a call instruction.

15. The method of claim 12, further comprising:
   receiving a return address buffer modification instruction; and
   performing at least one of: storing a return address in the return address buffer or removing a return address from the return address buffer.

16. The method of claim 12, further comprising: responsive to receiving a return address buffer pointer modification instruction, performing at least one of: incrementing the return address buffer pointer or decrementing the return address buffer pointer.

17. A computer-readable non-transitory storage medium comprising executable instructions that, when executed by a processing system, cause the processing system to perform operations, comprising:
   initializing a return address buffer pointer to point to an internal return address buffer;
   modifying a stack pointer;
   modifying the return address buffer pointer;
   responsive to determining that a boundary of the internal return address buffer is reached, causing the return address buffer pointer to point to an external return address buffer;
   responsive to receiving a return instruction, comparing a first return address referenced by the stack pointer to a second return address referenced by a return address buffer pointer; and
   executing the return instruction responsive to determining that the first return address is equal to the second return address.

18. The computer-readable non-transitory storage medium of claim 17, further comprising executable instructions causing the processing system to generate a stack fault exception responsive to determining that the first return address differs from the second return address.

19. The computer-readable non-transitory storage medium of claim 17, further comprising executable instructions causing the processing system to store a return address on the stack and in the return address buffer responsive to receiving a call instruction.

20. The computer-readable non-transitory storage medium of claim 17, further comprising executable instructions causing the processing system to:
   receive a return address buffer modification instruction; and
   perform at least one of: storing a return address in the return address buffer or removing a return address from the return address buffer.

* * * * *